(12) United States Patent
Cole et al.

(10) Patent No.: US 9,766,995 B2
(45) Date of Patent: Sep. 19, 2017

(54) SELF-SPAWNING PROBE IN A DISTRIBUTED COMPUTING ENVIRONMENT

(71) Applicants: Raymond E. Cole, Fort Collins, CO (US); Nimal K. K. Gamage, Fort Collins, CO (US)

(72) Inventors: Raymond E. Cole, Fort Collins, CO (US); Nimal K. K. Gamage, Fort Collins, CO (US)

(73) Assignee: CA, Inc., New York, NY (US)

( * ) Notice: Subject to any disclaimer, the term of this patent is extended or adjusted under 35 U.S.C. 154(b) by 513 days.

(21) Appl. No.: 14/295,879

(22) Filed: Jun. 4, 2014

(65) Prior Publication Data

US 2015/0355990 A1 Dec. 10, 2015

(51) Int. Cl.
*G06F 11/30* (2006.01)

(52) U.S. Cl.
CPC ...... *G06F 11/3093* (2013.01); *G06F 11/3006* (2013.01)

(58) Field of Classification Search
CPC ... G10L 15/265; H04M 3/51; H04M 2201/12; H04N 7/148; H04N 7/15; G06F 1/28; G06F 13/1663; G06F 1/3206; G06F 21/74

USPC ............. 379/9.03, 265.01–265.1, 266.02; 324/76.11, 500, 600, 756.2, 76.61, 324/754.01, 754.07–755.01, 690, 724

See application file for complete search history.

(56) References Cited

U.S. PATENT DOCUMENTS 8,631,403 B2 * 1/2014 Soundararajan ...... G06F 9/5077 718/1

* cited by examiner

*Primary Examiner* — Melissa Koval
*Assistant Examiner* — Trung Nguyen
(74) *Attorney, Agent, or Firm* — Baker Botts L.L.P.

(57) ABSTRACT

According to one embodiment, a system includes probes operable to monitor information associated with a host device and includes a controller operable to control the probes. A first probe instance is associated with a plurality of monitoring modules. Each monitoring module is operable to monitor information associated with the host device. The first probe instance is operable to determine a resource usage associated with the first probe instance and determine whether the resource usage exceeds a threshold. The first probe instance is operable to divide the plurality of monitoring modules into a first subset of monitoring modules and a second subset of monitoring modules. The first probe instance is operable to spawn a second probe instance, wherein the second probe instance is associated with the second subset of monitoring modules. The first probe module is operable to associate the first probe instance with the first subset of monitoring modules.

16 Claims, 4 Drawing Sheets

SELF-SPAWNING PROBE IN A DISTRIBUTED COMPUTING ENVIRONMENT

BACKGROUND

The disclosure relates generally to computing devices, and more specifically to a self-spawning probe in a distributed computing environment.

A distributed computing environment typically utilizes various computing systems that may communicate over a network while performing various operations. An administrator of a distributed computing environment may use probes to monitor information associated with one or more of these computing systems.

SUMMARY

According to one embodiment of the disclosure, a system includes a plurality of probes. Each probe is operable to monitor information associated with a host device. The system also includes a controller operable to control the plurality of probes. A first probe instance of one of the plurality of probes is associated with a plurality of monitoring modules. Each monitoring module is operable to monitor information associated with the host device. The first probe instance is also operable to determine a resource usage associated with the first probe instance and determine whether the resource usage exceeds a threshold. The first probe instance is also operable to divide the plurality of monitoring modules into a first subset of monitoring modules and a second subset of monitoring modules. The first probe instance is also operable to spawn a second probe instance, wherein the second probe instance is associated with the second subset of monitoring modules. The first probe module is also operable to associate the first probe instance with the first subset of monitoring modules.

In particular embodiments, the first probe instance requests, from the controller, permission to spawn a second probe instance. The first probe instance receives, from the controller, permission to spawn a second probe instance.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

Figure 1:
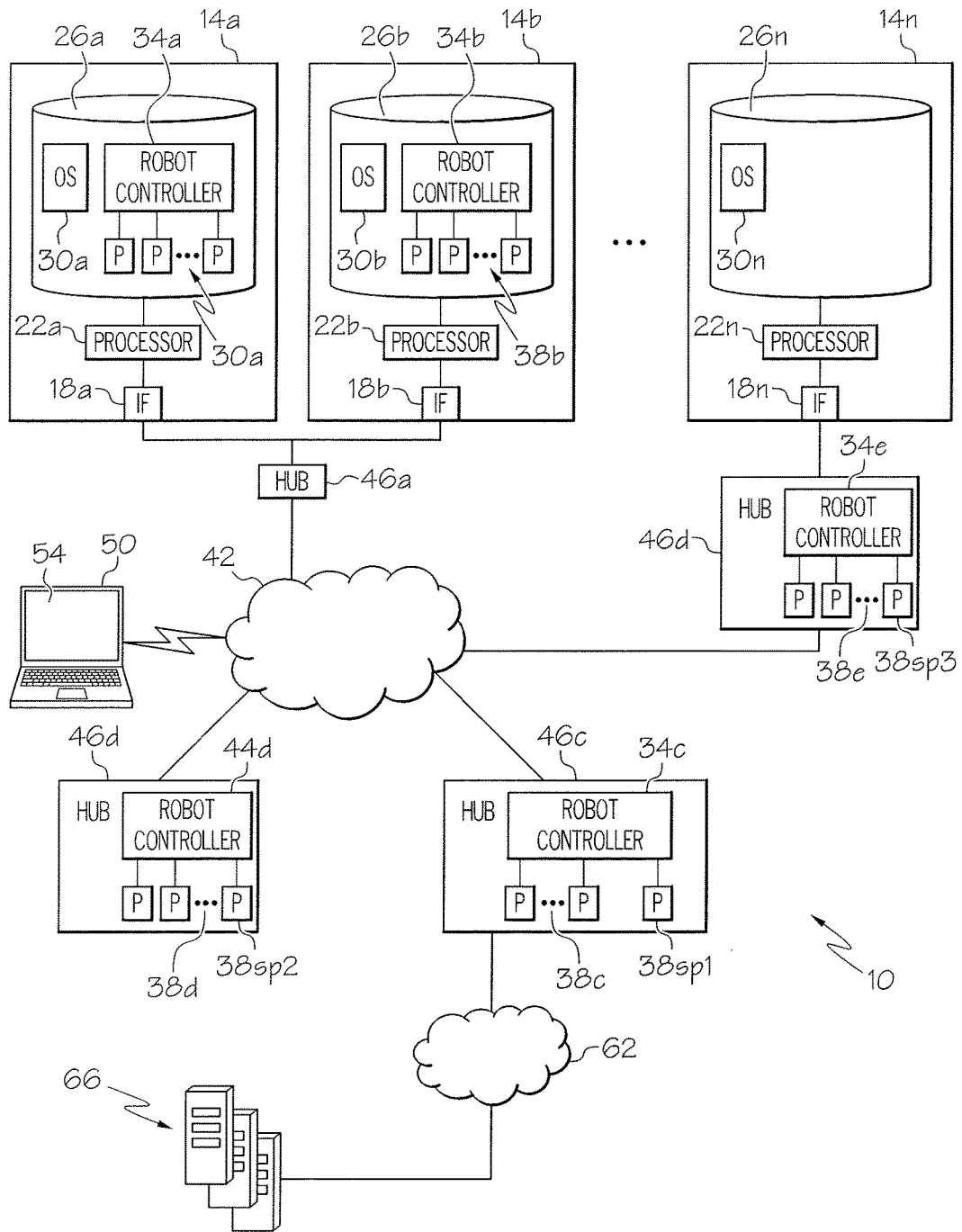
FIG. 1 illustrates an example of a system for monitoring information associated with host devices, and including one or more self-spawning probes, according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In general, aspects of the present disclosure relate to monitoring information associated with heterogeneous computing systems in a distributed computing environment. In particular embodiments, probes may be installed (e.g., by a network administrator, automatically, or otherwise) on a host device to monitor one or more aspects of the host device. For example, a network administrator may install a probe on a database server to monitor database operations, a probe on a web server to monitor web server operations, and/or a probe on a file server to monitor disk usage information or CPU usage information. Over time and for a variety of possible reasons, a probe may process increasing amounts of information. At some point, a probe may reach a resource limit, such as a virtual machine memory limitation. In particular embodiments, a self-spawning probe is configured to detect when the probe is approaching a resource limit and spawn another instance of itself to share the workload, using one or more other resources if appropriate. In particular embodiments, a self-spawning probe may be configured to spawn another instance of itself to balance resource allocation even without reaching a resource limit.

FIG. 1 illustrates an example of a system 10 for monitoring information associated with host devices 14, and including one or more self-spawning probes, according to one embodiment of the present disclosure. As illustrated, system 10 includes host devices 14 and probes 38 installed on various host devices 14. Probes 38 may monitor information associated with host devices 14. Probes 38 may monitor any information (or data) associated with host devices 14, such as information regarding applications installed on a host device 14, information regarding any host device 14 and/or any other devices connected to one or more networks, information regarding virtualization associated with host device 14, information regarding storage associated with a host device 14, information regarding cloud computing associated with a host device 14, any other information associated with a host device 14, any other suitable information, or any combination of the preceding.

By monitoring information associated with host devices 14, probes 38 may gather such information for various purposes. As examples, at least a portion of the monitored information may be provided for view by a user, at least a portion of the monitored information may be stored (such as for later use and/or for later reference), at least a portion of the monitored information may be processed, grouped, characterized, and/or summarized for view by a user, at least a portion of the monitored information may be compared to one or more thresholds, any other suitable use of the monitored information, or any combination of the preceding.

Host device 14 represents any components operable to process information, and may be implemented using any suitable combination of hardware, firmware, and software. Host device 14 may include any suitable type of computer system, such as a network server, any remote server, a mainframe, a host computer, a workstation, a web space server, a personal computer, a file server, a virtual device, or any other device that may electronically process information. The operations of host device 14 may be performed by any combination of one or more components at one or more locations. Host device 14 may include an operating system 30 that manages resources and provides services for computer programs installed on host device 14, in particular embodiments. Host device 14 may include (and/or may otherwise be associated with) information that may be monitored. In the illustrated embodiment, host device 14 includes a network interface 18, a processor 22, and a memory 26.

Network interface 18 represents any components operable to receive information from network 42, transmit information through network 42, perform processing of information, communicate to other devices, or any combination of the preceding, and may be implemented using any suitable combination of hardware, firmware, and software. For example, network interface 18 may receive information from hub 46. As another example, network interface 18 may communicate information for display to a user on user device 50. Network interface 18 represents any port or connection, real or virtual, including any suitable hardware and/or software, including protocol conversion and data processing capabilities, to communicate through a LAN, a metropolitan area network (MAN), a WAN, or other communication system that allows host device 14 to exchange information with network 42, user device 50, information database 58, or other components of system 10.

Processor 22 communicatively couples to network interface 18 and memory 26, and controls the operation and administration of host device 14 by processing information received from network interface 18 and memory 26. For example, processor 22 executes operating system 30 to manage resources and provide services for one or more applications and/or computer programs. Processor 22 may be a programmable logic device, a microcontroller, a microprocessor, any processing device, or any combination of the preceding.

Memory 26 stores, either permanently or temporarily, data, operational software, or other information for processor 22. Memory 26 includes any suitable combination of volatile or non-volatile local or remote devices suitable for storing information. For example, memory 26 may include RAM, ROM, magnetic storage devices, optical storage devices, or any other information storage device or a combination of these devices. While illustrated as including particular modules, memory 26 may include any information for use in the operation of host device 14.

In the illustrated embodiment, memory 26 includes operating system 30, robot controller 34, and probes 38. Operating system 30 represents any suitable set of instructions, logic, or code embodied in a computer readable storage medium and operable to manage resources and provide services for one or more applications and/or computer programs. Operating system 30 may include any suitable operating systems, such as IBM's zSeries/Operating System (z/O5), MS-DOS, PC-DOS, MAC-OS (such as MAC OS X), WINDOWS, UNIX, OpenVMS®, LINUX®, SOLARIS, ADVANCED INTERACTIVE EXECUTIVE (AIX), HP-UX®, UBUNTU®, DEBIAN®, or any other appropriate operating systems, including future operating systems.

Robot controller 34 represents any suitable set of instructions, logic, or code embodied in a computer readable storage medium and operable to control probes 38. Robot controller 34 may be implemented using any suitable combination of hardware, firmware, and software. The present disclosure contemplates robot controller 34 being operable to control any aspect of probes 38. For example, robot controller 34 may control: which probes 38 are installed on host device 14 (such as by installing, re-installing, and/or uninstalling particular probes 38 on a host device 14); starting or stopping of probes 38; when probes 38 monitor information associated with a host device 14; the type of information that probes 38 monitor for; any transmission of the monitored information over network 42 (such as when a transmission may occur and what information may be included in a transmission); any other aspect associated with probes 38; or any combination of the preceding. In certain embodiments, robot controller 34 may further control any aspect regarding the monitoring of information associated with host devices 14.

Probe 38 represents any suitable set of instructions, logic, or code embodied in a computer readable storage medium and operable to monitor information associated with host devices 14. Probe 38 may be implemented using any suitable combination of hardware, firmware, and software. Each probe 38 may perform a particular operation or set of operations associated with monitoring information of one or more corresponding host devices 14. For example, a first probe 38 may monitor for a first type of information, while a second probe 38 (and any other subsequent probes 38) may monitor different types of information. Additionally, or alternatively, a single probe 38 may perform multiple operations and/or may monitor multiple types of information.

The types of information that a probe 38 may monitor may include any suitable combination of: (1) network-based information; (2) application-based information; (3) virtualization-based information; (4) storage-based information; (5) cloud-based information; and (6) any other suitable type of information. As an example, a probe 38 may monitor information regarding applications installed on host devices 14 (such as what applications are installed, what applications are currently running, what applications have expired service contracts, etc.), information regarding any host device 14 and/or any other devices connected to one or more networks (such as the Internet Protocol (IP) address of any host device, the Media Access Control (MAC) address of any host device, the user of a host device, etc.) information regarding virtualization associated with a host device 14 (such as how much processing power is being utilized by a host device 14, how much processing power is unused, etc.), information regarding storage associated with a host device 14 (such as how much storage is currently being used, how much storage is not being used, the type of storage (e.g., RAM, ROM, etc.), etc.), information regarding cloud computing associated with a host device 14 (such as what host devices 14 are implemented in cloud computing, the cost associated with the cloud computing, etc.), any other information associated with a host device 14, or any combination of the preceding.

As a further example, probes 38 may monitor for alarms associated with host devices 14. As just one example, one or more thresholds may be established for the host device 14 (such as a threshold of 80% processor usage), and when those thresholds are reached (or exceeded), an alarm may be generated, which may be detected and/or generated by probes 38. Probes 38 may monitor information regarding alarms (and/or thresholds) associated with a host device 14 (such as what types of alarms are being monitored for, what alarms have been generated, how long an alarm has been generated for, etc.). As another example, probes 38 may monitor for usage information of robot controllers 34 and probes 38. In such an example, as robot controllers 34 and probes 38 are used to monitor information, their usage may be monitored and stored.

In particular embodiments, probe 38 may collect information from other probes 38. As an example, probe 38, which may also be referred to as a derived metrics engine (DME), may monitor network 42 for particular messages types from other probes 38. In some embodiments, DME 38 may modify information contained within the monitored message type and publish the modified information in another message. For example, DME 38 may monitor for messages containing disk usage information. Disk usage information in the message may be represented as a number of bytes of consumed disk space. DME 38 may convert the disk usage information contained in the message from a number of bytes to a percentage of total disk space available. DME 38 may then publish the new information. In this way, a network operator (network administrator, network user, or any suitable person or machine) may customize information reported about the network from an existing probe 38 without modifying or replacing existing probe 38. A network operator may deploy a probe 38 configured to derive customized information based on information in existing messages.

As another example, probe 38 may aggregate information collected from other probes 38. For example, referring to FIG. 1, probe 38c may listen for all messages of type X coming from probes 38a and 38b. In one example, host devices 14a and 14b may represent web servers located behind a load balancer and message type X may contain information about the number of simultaneous connections on each web server. Probe 38a may periodically publish message type X containing the number of simultaneous web server connections on host device 14a. Probe 38b may periodically publish message type X containing the number of simultaneous web server connections on host device 14b. Probe 38c may listen for and receive messages of type X and calculate the average number of web server connections handled by the load balancer, which probe 38c may derive from information contained in messages of type X that it receives from probes 38a and 38b. A network operator may use such derived information to determine whether its web hosting service is near capacity. The location of probe 38 within system 10 may determine what messages are available to probe 38. For example, probe 38 located on host device 14 may only have access to messages from other probes 38 located on the same host device 14. Probe 38 located on regional hub 46 may have access to messages from all probes 38 located on the regional portion of the network. In some embodiments, robot controller 34 may be configured to share messages between probes 38 located on the same host device 14. Robot controller 34 may share messages between probes 38 under its control without publishing messages on network 42.

In some embodiments, probe 38 may monitor its own resource usage. For example, probe 38 may monitor its own CPU usage, memory usage, message queue status, data throughput, or any other suitable resource. As one example, probe 38 may be implemented as a Java virtual machine. Probe 38 may monitor the resource usage of the Java virtual machine. In some embodiments, probe 38 may compare its own resource usage against threshold values. If resource usage of probe 38 exceeds a threshold value, probe 38 may notify other components of system 10. For example, probe 38c may notify robot controller 34c or hub 46c that probe 38c is exceeding a resource usage threshold. In response to such a notification, robot controller 34c or probe 46c may decrease the resources used by probe 38. In some embodiments, robot controller 34c or hub 46c may spawn another instance of probe 38c, such as probe 38sp1. Probe 38c and probe 38sp1 may share the workload previously handled by probe 38c alone. In some embodiments, robot controller 34c or hub 46c may communicate a request to robot controller 34d or hub 46d for robot controller 34d or hub 46d to spawn another instance of probe 38a, such as probe 38sp2. As another example, probe 38 may notify a network user by sending an alarm or event to user device 50 for view in graphical user interface 54. A network user may take action to decrease the resource usage of probe 38 by manually starting another instance of probe 38. A network user may also add additional components of system 10, such as additional hubs 46 or additional probes 38, to decrease the resource usage of probe 38. A network user may reallocate probes 38 from one hub 46 to another hub 46. In some embodiments, if resource usage of probe 38 exceeds a threshold value, probe 38 may take autonomous actions to decrease its resource usage. For example, probe 38c may spawn another instance of itself, such as probe 38sp1. Probe 38c and probe 38sp1 may share the workload previously handled by probe 38c alone. An example of self-spawning probe 38 is described in more detail below with respect to FIG. 2.

Although FIG. 1 is illustrated as only including three probes 38 installed on a particular host device 14 (e.g., three probes 38a installed on host device 14a and three probes 38b installed on host device 14b), any number of probes 38 may be installed on a host device 14. For example, a host device 14 may include no probes 38, a single probe 38, ten probes 38, one hundred probes 38, one thousand probes 38, or any other number of probes 38.

Furthermore, although FIG. 1 is illustrated as only including three host devices (e.g., host device 14a, host device 14b, and host device 14n), any number of host devices 14 may be included in system 10. For example, system 10 may include a single host device 14, ten host devices 14, one hundred host devices 14, one thousand host devices 14, or any other number of host devices 14. Additionally, although host device 14 has been described above as including a robot controller 34 and probes 38, in particular embodiments, one or more host devices 14 may not include a robot controller 34 and/or probes 38. For example, as is illustrated in FIG. 1, host device 14n may not include either a robot controller 34 or any probes 38. Instead, if appropriate, one or more probes 38 installed on another host (such as host device 14a) may monitor information associated with host device 14n, in particular embodiments. As such, probes 38 may be able to monitor any type of information associated with host device 14n (such as information regarding memory usage in host device 14n, processing capabilities in host device 14n, applications installed in host device 14n, or any other information) without probes 38 (or a robot controller 34) being installed on host device 14n.

Network 42 represents any network operable to facilitate communication between various components of system 10, such as host devices 14, hub 46, user device 50, and information database 58. Network 42 may facilitate message exchange between hubs 46, robot controllers 34, probes 38, user device 50, and information database 58. In some embodiments, network 42 may be referred to as message bus 42. Network 42 may include any interconnecting system capable of transmitting audio, video, signals, data, messages, or any combination of the preceding. Network 42 may include all or a portion of a public switched telephone network (PSTN), a public or private data network, a LAN, a MAN, a WAN, a local, regional, or global communication or computer network, such as the Internet, a wireline or wireless network, an enterprise intranet, or any other communication link, including combinations thereof, operable to facilitate communication between the components.

Hub 46 represents any components operable to link robot controllers 34 to each other, and may be implemented using any suitable combination of hardware, firmware, and software. For example, hub 46a may allow a first robot controller 34 (such as robot controller 34a) to communicate with and/or coordinate with any other robot controller (such as robot controller 34b). Hub 46 may include any suitable type of computer system, such as a network server, any remote server, a mainframe, a workstation, a web space server, a personal computer, a file server, a virtual device, or any other device that may link robot controllers 34 to each other. The functions of hub 46 may be performed by any combination of one or more servers or other components at one or more locations. In the embodiment where the module is a server, the server may be a virtual or physical server. The server may include one or more servers at the same or remote locations. Also, hub 46 may include any component that functions as a server. Hub 46 may represent any suitable set of instructions, logic, or code embodied in a computer readable storage medium and operable to link robot controllers 34 to each other, in particular embodiments. As an example, hub 46 may be a particular type of robot controller (such as, for example, a robot controller 34) that may utilize (and/or control) one or more particular types of probes (such as, for example, probes 38) to link robot controllers 34 to each other.

In particular embodiments, hub 46 may link other hubs 46 to each other. For example, hub 46c may link hubs 46a and 46b to each other. In some embodiments, hubs 46 may be linked in a hierarchical relationship. For example, in certain embodiments, both hubs 46a and 46b may communicate with hub 46c, but hubs 46a and 46b may not communicate with each other. In particular embodiments, hubs 46 may be organized hierarchically with central hubs responsible for regional hubs. Regional hubs may serve a regional office, a datacenter, a campus, or any other suitably sized portion of a network. In particular embodiments, any hub 46 may communicate with any other hub 46.

In particular embodiments, hub 46 may control any aspect of robot controllers 34. For example, a hub 46 may: control which robot controllers 34 are installed on a host device 14 (such as by installing, re-installing, and/or uninstalling a particular robot controller 34 on a host device 14); control transmission of the monitored information over network 42 (such as when a transmission may occur and what information may be included in a transmission); control any other aspect associated with robot controllers 34; provide instructions to a robot controller 34 (such as instructions regarding what probes 38 to install, what probes 38 to start or stop, what information a probe 38 should monitor for, or any other instructions); or any combination of the preceding.

Hub 46 may provide access control, in particular embodiments. For example, hub 46 may determine whether a first robot controller 34 (such as robot controller 34a) is allowed to access (e.g., communicate with, coordinate with, etc.) another robot controller 34 (such as robot controller 34b) based on a permission level of the first robot controller 34 and/or the other robot controller 34. For example, if the first robot controller 34 does not have the correct permission level to communicate with the other robot controller, hub 46 may prevent the first robot controller 34 from doing so. Such access control provided by hub 46 may be applicable to host devices 14 and probes 38, thereby allowing or preventing access to host devices 14 and/or probes 38 (in addition to robot controllers 34). For example, hub 46 may prevent a first probe 38 (such as one of probes 38a) from accessing another host device 14 and/or another probe 38 if the first probe 38 does not have the correct permission level.

Hub 46 may further link the devices of network 42 to one or more devices of network 62, such as monitoring database 66. For example, hub 46 may be an access point through which communication may pass from monitoring database 66 to one or more devices of network 42 (or vice versa). In such an example, hub 46 may allow one or more probes 38 to be downloaded (or otherwise communicated) from monitoring database 66 to a host device 14 for installation. Furthermore, by acting as an access point through which communication may pass from monitoring database 66 to one or more devices of network 42, hub 46 may provide security for network 42.

Although FIG. 1 illustrates hub 46 as being a separate component from the other components of FIG. 1, in particular embodiments, hub 46 may be integrated with any of the other components of FIG. 1. As an example, hub 46 may be integrated with a host device 14, such as host device 14a. In such an example, instructions, logic, or code associated with hub 46 may be stored in memory 26a of host device 14a. This may allow host device 14a (and processor 22a) to perform one or more functions of hub 46 (in addition to one or more functions of robot controller 34a). In particular embodiments, other components of FIG. 1 may be integrated with hub 46. As an example, hub 46 (such as hub 46c) may include a robot controller (such as robot controller 34c) and probes 38 (such as probes 38c). Furthermore, while FIG. 1 illustrates only a single hub 46 connecting network 62 to network 42, in particular embodiments, any suitable number of hubs 46 may connect network 62 to network 42. For example, two hubs 46 may connect network 62 to network 42, three hubs 46 may connect network 62 to network 42, ten hubs 46 may connect network 62 to network 42, or any other number of hubs 46 may connect network 62 to network 42.

Additionally, although system 10 is illustrated as including only one network 42, in particular embodiments, system 10 may include any number of hubs 46 and networks 42. For example, system 10 may include two hubs 46 and two networks 42, three hubs 46 and three networks 42, ten hubs 46 and ten networks 42, or any other number of hubs 46 and any other number of networks 42.

In particular embodiments, probes 38 may communicate monitored information to other components of system 10 by sending messages using network 42. In particular embodiments, probes 38 may directly send/receive messages to/from other components of system 10. For example, probe 38a may send a message directed to hub 46a and hub 46a may send a message directed to probe 38a.

In particular embodiments, probes 38 may publish messages on network 42 (also referred to as message bus 42). Published messages may not be directed to any one destination component. Instead, any interested component of system 10 may listen for and receive published messages from network 42. As an example, probe 38a may publish a message of message type X on network 42. Hub 46a may be interested in receiving all messages of type X. Hub 46 may monitor all messages on network 42 for messages of type X. When detecting a message of type X, hub 46 may process the message. Probe 38c may also be interested in receiving all messages of type X. Probe 38c may receive a message of type X published by probe 38a. Probe 38c may also receive a message of type X published by probe 38b. Probe 38c may aggregate information from the messages received from probe 38a and probe 38b and publish the aggregated information in a message of type Y. Components of system 10, such as probes 38 or hubs 46, may be interested in receiving or publishing any number of different message types. Components of system 10 may also monitor for messages based on message sender, any other message field, or any combination of message fields.

User device 50 represents any components (hardware and/or software) that may display information to a user. User device 50 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10 in order to display information to a user. User device 50 may further allow a user to request information from host devices 14, robot controllers 34, and/or probes 38. For example, a user may want to view a particular type of information. The user may communicate such a request (using user device 50) to a robot controller 34 (such as robot controller 34a), causing a probe 38 (such as probe 38a) to monitor for, and provide such information for view by the user. User device 50 may comprise a user interface, such as a display, a microphone, keypad, or other appropriate terminal equipment usable by a user.

User device 50 may display a graphical user interface 54 in order to allow a user to view the monitored information (such as the monitored information provided by host devices 14 and/or information database 58). Graphical user interface 54 may include any graphical interface that allows the user to view the monitored information, request particular monitored information (such as from host devices 14 and/or information database 58), communicate with monitoring database 66 (such as to request a new version of particular probes 38), or any combination of the preceding. Graphical user interface 54 may be accessible to a user through a web browser (or other portlet), in particular embodiments.

Graphical user interface 54 may display any information monitored by probes 38. For example, if a user requests information regarding devices connected to network 42, graphical user interface 54 may display a list of such devices, the IP address of each of the devices, the type of operating system 30 of those devices, the type and number of probes 38 installed on the devices, or any combination of the preceding. As another example, if a user requests information regarding alarms associated with the monitored information, graphical user interface 54 may display each of the alarms that have been generated, how many times those alarms have been generated, the devices those alarms are associated with, the probes associated with those alarms, or any combination of the preceding. Graphical user interface 54 may display the monitored information in real time or near real time (e.g., real time plus the time associated with monitoring, communicating, and formatting the information). In such an example, the user may request the monitored information directly from probes 38, and the monitored information may be provided in real time or near real time. Graphical user interface 54 may further display historical (or non-real time) monitored information. In such an example, the user may request the monitored information from the information database 58, and the monitored information may be provided. Graphical user interface 54 may display the monitored information in any configuration. Furthermore, graphical user interface 54 may be configured by the user in any manner to display the monitored information.

Information database 58 represents any components that may store information monitored by probes 38. For example, information database 58 may store information monitored by probes 38 and communicated to information database 58 for storage. Information database 58 may include a network server, any remote server, a mainframe, a host computer, a workstation, a web space server, a personal computer, a file server, a virtual device, or any other device that may store information monitored by probes 38. The functions of information database 58 may be performed by any combination of one or more servers or other components at one or more locations. In the embodiment where the module is a server, the server may be a virtual or physical server. The server may include one or more servers at the same or remote locations. In addition to storing information monitored by probes 38, information database 58 may further provide the information for view by a user. For example, a user may send a message to information database 58 that requests particular information from information database 58. As such, information database 58 may gather such information and communicate it for view by the user on user device 50. Furthermore, although system 10 illustrates information database 58 as being connected to network 42, in particular embodiments, information database 58 may be connected to network 62.

Network 62 represents any network operable to facilitate communication between various components of system 10, such as hub 46 (and/or any other devices connected to network 42) and monitoring database 66. Network 62 may include any interconnecting system capable of transmitting audio, video, signals, data, messages, or any combination of the preceding. Network 62 may include all or a portion of a PSTN, a public or private data network, a LAN, a MAN, a WAN, a local, regional, or global communication or computer network, such as the Internet, a wireline or wireless network, an enterprise intranet, or any other communication link, including combinations thereof, operable to facilitate communication between the components. Although FIG. 1 illustrates network 62 as being a separate network from network 42, in particular embodiments, network 62 and network 42 may both be the same network.

Monitoring database 66 stores, either permanently or temporarily, data, operational software, or other information for system 10. Monitoring database 66 includes any suitable combination of volatile or non-volatile local or remote devices suitable for storing information. For example, monitoring database 66 may include RAM, ROM, magnetic storage devices, optical storage devices, or any other information storage device or a combination of these devices. Monitoring database 66 represents any components that may communicate with hub 46 (and/or any other devices connected to network 42). Monitoring database 66 may include a network server, any remote server, a mainframe, a host computer, a workstation, a web space server, a personal computer, a file server, a virtual device, or any other device that may communicate with hub 46 (and/or any other devices connected to network 42). The functions of monitoring database 66 may be performed by any combination of one or more servers or other components at one or more locations. In the embodiment where the module is a server, the server may be a private server, and the server may be a virtual or physical server. The server may include one or more servers at the same or remote locations. Monitoring database 66 may be a part of any other component shown in system 10.

Monitoring database 66 may store packages associated with monitoring information. For example, monitoring database 66 may store packages that include the instructions, logic, or code associated with hub 46, robot controllers 34, and probes 38. In such an example, these packages may be downloaded (or otherwise communicated) from monitoring database 66 for installation on one or more devices (such as, for example, host device 14*a*) of network 42. Monitoring database 66 may store usage information associated with network 42, in particular embodiments. For example, in response to the use of robot controllers 34 and/or probes 38 in network 42, information associated with that usage (such as the amount of such usage, what host devices 14 the usage occurred on, etc.) may be communicated to monitoring database 66 (from host devices 14) for storage. This usage information may allow monitoring database 66 to calculate a bill associated with the usage, in particular embodiments. The bill may represent the cost associated with the use of robot controllers 34 and probes 38 to monitor information associated with host devices 14.

In operation of an example embodiment, a user may want to monitor information associated with one or more devices of a network (such as network 42). Furthermore, the user may also want to view the monitored information or information determined from the monitored information. A hub 46 may be installed in network 42 and one or more robot controllers 34 and probes 38 may be installed in one or more host devices 14 of network 42. The installation of hub 46, robot controllers 34, and probes 38 may occur in any suitable manner. For example, instructions, logic, or code associated with hub 46, robot controllers 34, and/or probes 38 may be downloaded from, for example, monitoring database 66 and installed in network 42 (such as installed on host device 14).

After robot controllers 34 and probes 38 are installed on host devices 14, probes 38 may monitor information associated with the host devices 14. This monitored information may be communicated to information database 58 for storage. A user may utilize user device 50 in order to request this stored information for viewing on graphical user interface 54. The monitored information may also be communicated directly to user device 50 for display in graphical user interface 54. In such an example, a user may request that probe 38 monitor particular information associated with host devices 14 (such as the unused memory in host device 14*n*). In response to this request, the probe 38 may monitor the information and send it directly to user device 50 for view in graphical user interface 54 in real time (or near real time). A user may be able to view and understand any monitorable aspects of the network and/or devices operating in the network.

In response to utilization of robot controllers 34 and/or probes 38, usage information may be monitored (such as by one of the probes 38) and communicated to monitoring database 66. This usage information may be used by monitoring database 66 to calculate a bill associated with the use of robot controllers 34 and probes 38. Furthermore, this bill may be communicated to the user of user device 50 (or any other entity associated with user device 50) for payment.

Over time and for a variety of possible reasons, probes 38 may process increasing amounts of information. For example, as network 42 grows, the amount of monitoring data transmitted on network 42 may increase. As a particular example, when a network operator adds more host devices 14 to network 42, a regional hub (such as hub 46*c*) may process more messages from probes 38 running on additional host devices 14. Probe 38*c* on hub 46*c* may monitor network 42 for messages of type X. As the number of probes 38 that generate messages of type X increases, the number of messages processed by probe 38*c* increases. At some point, the number of messages of type X arriving at probe 38*c* may exceed a message queue capacity of probe 38*c*, which may result in a performance bottleneck or lost information.

A network operator may alleviate the problem by monitoring the resource usage of probe 38*c*. If the resource usage of probe 38*c* approaches a threshold, a network operator may deploy additional hub 46*d*, additional robot controller 44*d*, or additional probes 38*d* to handle the increased workload. In particular embodiments, probe 38*c* may monitor its own resource usage. As the resource usage of probe 38*c* approaches a threshold, probe 38*c* may spawn another instance of itself, such as probe 38*sp*1, to share the workload.

According to particular embodiments, self-spawning probes 38 provide advantages over manual configuration of probes 38 by a network operator. For example, self-spawning probe 38 may detect in real time a resource usage threshold crossing and may respond quickly. Such quick reconfiguration may reduce or eliminate performance bottlenecks or lost information that might occur during the interval between a network operator detecting a resource threshold crossing and the network operator performing manual reconfiguration.

Modifications, additions, or omissions may be made to system 10 without departing from the scope of the invention. Additionally, system 10 may include any number of host devices 14, networks 42, user devices 50, information databases 58, networks 62, and/or monitoring databases 66. Furthermore, any suitable logic may perform the functions of system 10 and the components within system 10.

Figure 2:
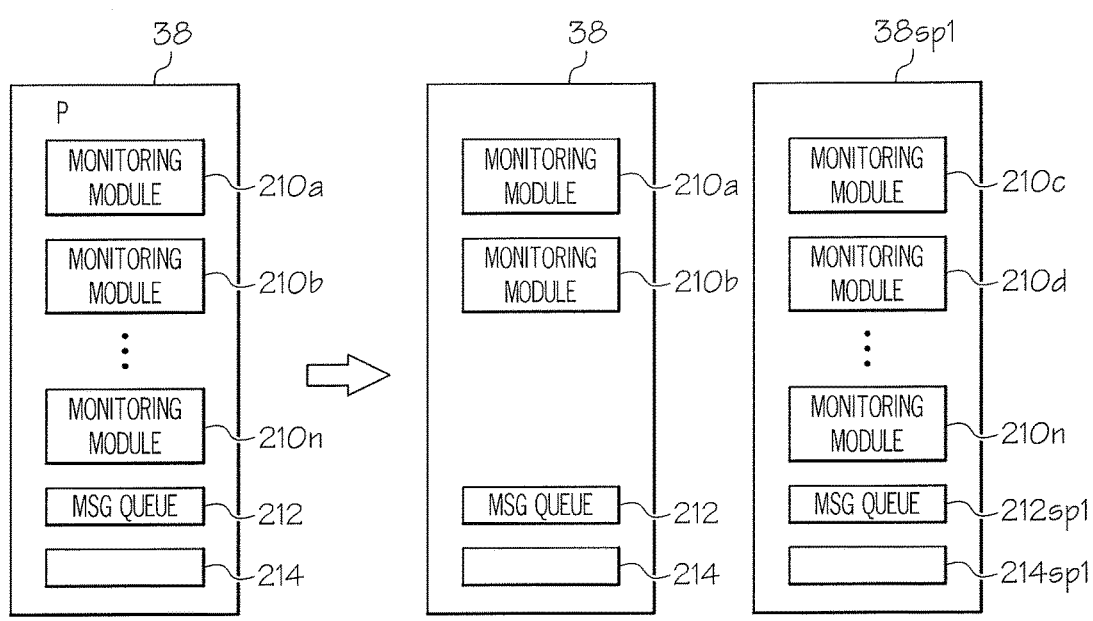
FIG. 2 illustrates an example of a system for implementing a self-spawning probe according to one embodiment of the present disclosure.

FIG. 2 illustrates an example of a system for implementing a self-spawning probe according to one embodiment of the present disclosure. Probe 38 represents any suitable set of instructions, logic, or code embodied in a computer readable storage medium and operable to monitor information associated with host devices 14. As illustrated, probe 38 comprises a plurality of monitoring modules 210, message queue 212, and spawning logic 214. Probe 38 may perform multiple operations or monitor multiple types of information.

Monitoring modules 210 represent any suitable set of instructions, logic, or code embodied in a computer readable storage medium and operable to monitor one or more aspects of host device 14, according to some embodiments. For example, monitoring module 210*a* may monitor for and process messages of type A. Monitoring module 210*b* may monitor for and process messages of type B. Monitoring module 210*c* may read a value from host device register C. Monitoring module 210*d* may read a value from host device register D. Monitoring module 210*n* may monitor for and process messages of type N. Probe 38 may receive a list of monitoring modules 210 during initialization. In this manner, a first instance of probe 38 may perform a first set of monitoring operations based on its received list of monitoring modules 210. A second instance of probe 38 may perform a second set of monitoring operations based on its received list of monitoring modules 210. The first and second set of monitoring operations may or may not overlap between first instance of probe 38 and second instance of probe 38, depending on the list of monitoring modules 210 each instance of probe 38 received during initialization. In some embodiments, the first and second set of monitoring operations may be identical between a first instance of probe 38 and a second instance of probe 38. In some embodiments, the set of monitoring modules 210 comprising probe 38 may be modified at any time, even after initialization.

As an example according to some embodiments, VM probe 38 may monitor resource usage of virtual machines on host device 14. Monitoring module 210*a* may represent instructions, logic, or code embodied in a computer readable storage medium operable to monitor a Windows virtual machine. Monitoring module 210*b* may represent instructions, logic, or code embodied in a computer readable storage medium operable to monitor a UNIX virtual machine. An instance of VM probe 38 initialized with a list of monitoring modules including monitoring module 210*a* may monitor Windows virtual machines. An instance of VM probe 38 initialized with a list of monitoring modules including monitoring module 210*b* may monitor UNIX virtual machines. An instance of VM probe 38 initialized with a list of monitoring modules including monitoring module 210*a* and monitoring module 210*b* may monitor both Windows and UNIX virtual machines.

Message queue 212 may send/receive messages to/from other components of system 10, such as robot controllers 34 or hubs 46. Message queue 212 represents any memory suitable for storing messages sent or received by probe 38, according to some embodiments. For example message queue 212 may include transmit and receive queues associated with a network interface card, transmit and receive queues associated with a socket interface, queues associated with any network protocol, or any other suitable memory. As an example, probe 38 may communicate with robot controller 34 or hub 46 using a socket interface. A socket may have a maximum queue depth. Probe 38 may be operable to monitor usage of message queue 212. For example, probe 38 may monitor whether message queue 212 is at or near its maximum queue depth. Although one message queue 212 is illustrated in FIG. 2, probe 38 may comprise any number of message queues 212.

Spawning logic 214 represents any suitable set of instructions, logic, or code embodied in a computer readable storage medium and operable to spawn another instance or multiple instances of probe 38, according to some embodiments. In particular embodiments, spawning logic 214 may spawn another instance of probe 38 using any suitable mechanism of operating system 30 to start another instance of probe 38. For example, probe 38 may fork another process or multiple processes, spawn another thread or multiple threads, spawn another task or multiple tasks, or invoke any other suitable interface. If probe 38 is implemented as a java virtual machine, spawn logic 214 may spawn another Java virtual machine configured to perform the functions of probe 38.

In particular embodiments, spawn logic 214 may communicate a spawn request to another component of system 10, such as robot controller 34 or hub 46. The other component of system 10 may evaluate the spawn request and communicate back to spawn logic 214 permission to spawn another instance of probe 38. For example, spawn logic 214 of probe 38d may request permission from robot controller 44d to spawn another instance of probe 38d. Robot controller 44d may evaluate the current resource usage of hub 46d (e.g., CPU usage, disk usage, memory usage, data throughput, or any suitable resources or combination of resources) and robot controller 44d may determine that hub 46d has enough available resources to support another instance of probe 38d. Robot controller 44d may communicate to spawn logic 214 of probe 38d permission to spawn. Spawn logic 214 may spawn another instance of probe 38d, probe 38sp2.

In particular embodiments, spawn logic 214 may communicate a spawn request to another component of system 10, such as robot controller 34 or hub 46. The other component of system 10 may identify another robot controller 34, hub 46, or host device 14 with resources available to run another instance of probe 38. For example, spawn logic 214 of probe 38d may request permission from hub 46d to spawn another instance of probe 38d. Hub 46d may evaluate the current resource usage of hub 46d (e.g., CPU usage, disk usage, memory usage, data throughput, or any suitable resources or combination of resources) and hub 46d may determine that hub 46d does not have enough available resources to support another instance of probe 38d. Hub 46d may communicate with hub 46c to determine whether hub 46c has resources available to support an instance of probe 38d. If hub 46c does have resources available, hub 46d may request hub 46c to spawn another instance of probe 38d, probe 38sp1. In particular embodiments, hub 46d may also communicate an installation package for probe 38d to hub 46c.

In an example embodiment of operations, VM probe 38 may monitor resource usage of virtual machines on host device 14. VM probe 38 may comprise three monitoring modules 210: monitoring module 210a for monitoring a Windows virtual machine, monitoring module 210b for monitoring a UNIX virtual machine, and monitoring module 210c for monitoring a Mac OS X virtual machine. VM probe 38 may be implemented as a Java virtual machine. VM probe 38 java virtual machine may be configured to use a memory heap size of 512 megabytes. Initially, VM probe 38 may monitor two Windows virtual machines, three UNIX virtual machines, and one Mac OS X virtual machine running on host device 14. VM probe 38 may have sufficient java virtual machine memory available to monitor these six virtual machines. An example VM probe 38 is illustrated to the left of the arrow in FIG. 2.

Over time, VM probe 38 may monitor twenty Windows virtual machines, five UNIX virtual machines, and twenty-five Mac OS X virtual machines running on host device 14. VM probe 38 may then use, for example, 510 megabytes of the 512 megabytes allocated for its Java virtual machine. VM probe 38 may determine that 2 available megabytes of memory is below a critical threshold. VM probe 38 may not be able to monitor any additional virtual machines with only 2 megabytes of available memory. To decrease its memory resource usage, VM probe 38 may divide its list of monitoring modules 210 into two subsets and then spawn another instance of itself. VM probe 38 may create a first subset comprising monitoring module 210a and monitoring module 210b and a second subset comprising monitoring module 210c. VM probe 38 may spawn an additional instance of itself, VM probe 38sp1, initialized with monitoring module 210c. VM probe 38 may modify its own initialization information to include monitoring module 210a and monitoring module 210b, but not monitoring module 210c, and then restart itself. In some embodiments, VM probe 38 may be configured to stop monitoring module 210c without restarting itself. After spawning the new instance, the Java virtual machines for both VM probe 38 and VM probe 38sp1 may now have sufficient available memory. An example of VM probe 38 and VM probe 38sp1 is illustrated to the right of the arrow in FIG. 2. Additional details regarding self-spawning probe 38 are described below with regard to FIG. 3 and FIG. 4.

Modifications, additions, or omissions may be made to probe 38 without departing from the scope of this disclosure. For example, probe 38 may comprise any number of monitoring modules 210 and message queues 212. Additionally, probe 38 may spawn any number of instances of itself.

Figure 3:
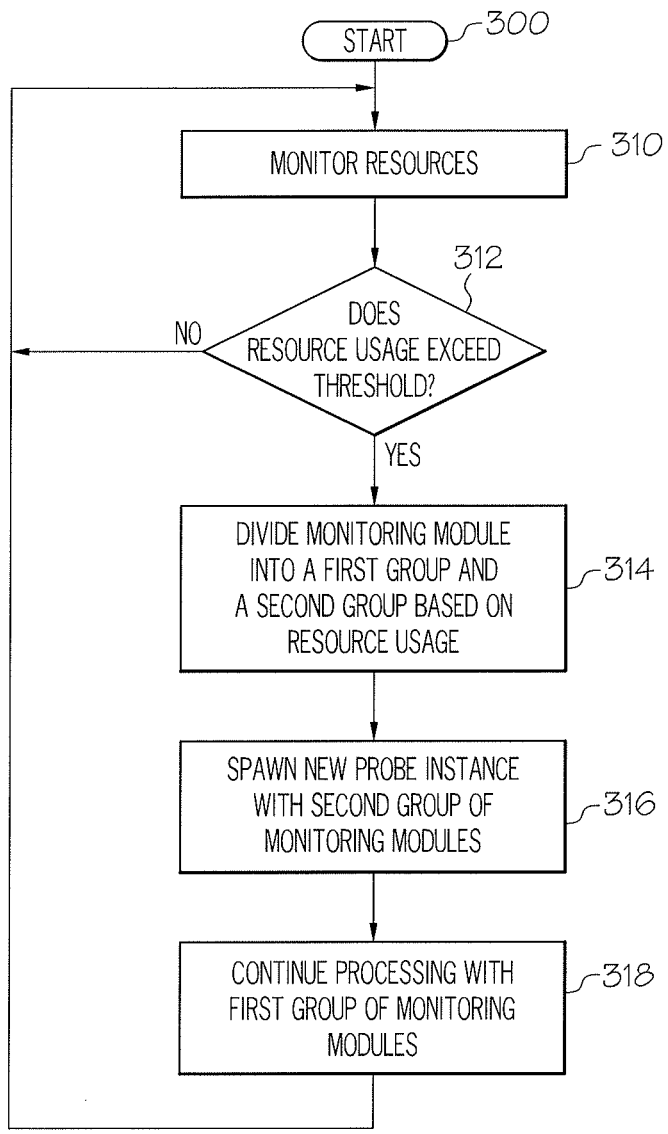
FIG. 3 illustrates an example of a method for implementing a self-spawning probe according to one embodiment of the present disclosure.

FIG. 3 illustrates an example of a method 300 for implementing a self-spawning probe according to one embodiment of the present disclosure. In particular embodiments, one or more steps of method 300 may be performed by probe 38 of FIG. 1 and FIG. 2.

The method begins at step 310. At step 310, probe 38 monitors its resource usage. For example, probe 38 may monitor its memory usage. If probe 38 is implemented in a Java virtual machine, probe 38 may monitor the memory usage of the Java virtual machine. Probe 38 may monitor its CPU usage or disk usage. Probe 38 may monitor status of message queue 212. Probe 38 may monitor data throughput such as the number of messages probe 38 processes in a given time period. In some embodiments, probe 38 may monitor any network statistics or network protocol statistics associated with its communication on network 42 or any other network. In some embodiments, probe 38 may monitor any finite resource associated with probe 38.

At step 312, probe 38 determines whether its resource usage exceeds a threshold value. For example, probe 38 may compare its current, average, or estimated memory usage against a threshold value, such as a percentage of memory available. If probe 38 is implemented in a Java virtual machine, the threshold value may comprise a percentage of the memory allocated to the virtual machine. As another example, probe 38 may compare a current, average, or estimated high-water mark associated with message queue 212 against a threshold, such as a percentage of the size of message queue 212. Probe 38 may compare any monitored value against a suitable threshold value.

As an example, DME probe 38 may comprise two monitoring modules 210: monitoring module 210a may listen for and process messages of type A generated by host devices 14, and monitoring module 210b may listen for and process messages of type B generated by host devices 14. DME probe 38 may receive both messages of type A and type B on message queue 212. As more host devices 14 are added to network 42, DME probe 38 may receive an increasing number of messages of type A and type B. DME probe 38 may monitor message queue 212 to determine whether messages in the queue exceed eighty percent of the queue size.

If the resource usage of probe 38 does not exceed a threshold value, the method may return to step 310 to continue monitoring resources of probe 38. If the resource usage of probe 38 exceeds a threshold value, the method continues to step 314.

At step 314, probe 38 divides monitoring modules 210 into a first group and a second group. In some embodiments, probe 38 may divide monitoring modules 210 into a first group and a second group based on resource usage. Probe 38 may divide monitoring modules 210 between a first group and a second group to substantially balance an amount of resource usage associated with monitoring modules 210 in the first group and an amount of resource usage associated with monitoring modules 210 in the second group. For example, if monitoring module 210*a* uses forty percent of system memory, monitoring module 210*b* also uses forty percent, monitoring module 210*c* uses five percent, and monitoring module 210*d* uses ten percent, then probe 38 may group monitoring modules 210*a* and 210*c* (totaling forty-five percent memory usage) into a first group and monitoring modules 210*b* and 210*d* (totaling fifty percent memory usage) into a second group. In some embodiments, probe 38 may evenly divide the number of monitoring modules between the first group and the second group. In some embodiments, probe 38 may include the same monitoring module in both the first and second group. Probe 38 may divide the monitoring modules in any suitable manner. Although the examples above describe dividing monitoring modules 210 into two groups, probe 38 may divide monitoring modules 210 into any suitable number of subgroups.

As an example, upon determining message queue 212 of DME probe 38 has exceeded a threshold limit, DME probe 38 may divide its monitoring modules 210 into two groups. The first group may include monitoring module 210*a* and the second group may include monitoring module 210*b*.

At step 316, probe 38 may spawn another instance of itself configured with the second group of monitoring modules 210. Probe 38 may spawn another instance of itself using any suitable mechanism of operating system 30 to start another instance of itself. For example, probe 38 may fork another process or multiple processes, spawn another thread or multiple threads, spawn another task or multiple tasks, or invoke any other suitable interface. Probe 38 may spawn another Java virtual machine configured to perform the functions of probe 38. Probe 38 may communicate the second group of monitoring modules 210 to the newly spawned instance through command line parameters, an initialization file, any other suitable mechanism, or any combination of mechanisms. In some embodiments, probe 38 may divide monitoring modules 210 into three groups and spawn two instances of itself. In some embodiments, probe 38 may spawn any number of instances of itself. In some embodiments, probe 38 may ask permission before spawning another instance of itself. For example, probe 38 may request permission from robot controller 34 or hub 46 before spawning another instance of itself.

As an example, DME probe 38 may spawn another instance of itself and pass the new instance a command line parameter identifying message type B. Based on the command line parameter, the newly spawned instance of DME probe 38 may use monitoring module 210*b* to listen for and process messages of type B generated by host devices 14.

At step 318, probe 38 may continue processing with the first group of monitoring modules 210. In some embodiments, probe 38 may modify its initialization parameters to include only the first group of monitoring modules 210 and then restart itself using the new initialization information. In some embodiments, probe 38 may stop all processing associated with the second group of monitoring modules 210 without restarting itself.

As an example, DME probe 38 may restart itself by spawning another instance of itself and passing the new instance a command line parameter identifying message type A. Based on the command line parameter, the newly spawned instance of DME probe 38 may use monitoring module 210*a* to listen for and process messages of type A generated by host devices 14. After spawning the new instance of itself, original DME probe 38 may exit. As an example of another embodiment, DME probe 38 may not restart, but instead DME probe 38 may stop monitoring for messages of type B while continuing to monitor for messages of type A.

After step 318, the method may return to step 310 to continue monitoring resources of probe 38. Modifications, additions, or omissions may be made to method 300. Additionally, one or more steps in method 300 of FIG. 3 may be performed in parallel or in any suitable order.

While steps of method 300 are described as being performed by probe 38, steps of method 300 may be performed by other components of system 10, such as robot controller 34. For example, at step 310, robot controller 34 may monitor resource usage of probe 38. At step 312, robot controller 34 may determine whether resource usage of probe 38 exceeds a threshold value. At step 314, robot controller 34 may divide monitoring modules 210 of probe 38 into a first group and a second group. At step 316, robot controller 34 may spawn another instance of probe 38 configured with the second group of monitoring modules 210. At step 318, robot controller 34 may restart probe 38 configured with the first group of monitoring modules 210. In some embodiments, hub 46 may perform steps of method 300.

In some embodiments, probe 38 may spawn another instance of itself and both instances may use the same set of monitoring modules 210. For example, DME probe 38 may spawn another instance of itself and both instances may comprise monitoring modules 210*a* and 210*b*. In this example, both instances of DME probe 38 are monitoring for messages of type A and type B. Instances of DME probes 38 may balance the work load between them by monitoring messages based on additional criteria. For example, a first instance of DME probe 38 may only monitor for and process messages of type A and B that originate from host device 14*a*. A second instance of DME probe 38 may only monitor for and process messages of type A and B that originate from host device 14*b*.

Figure 4:
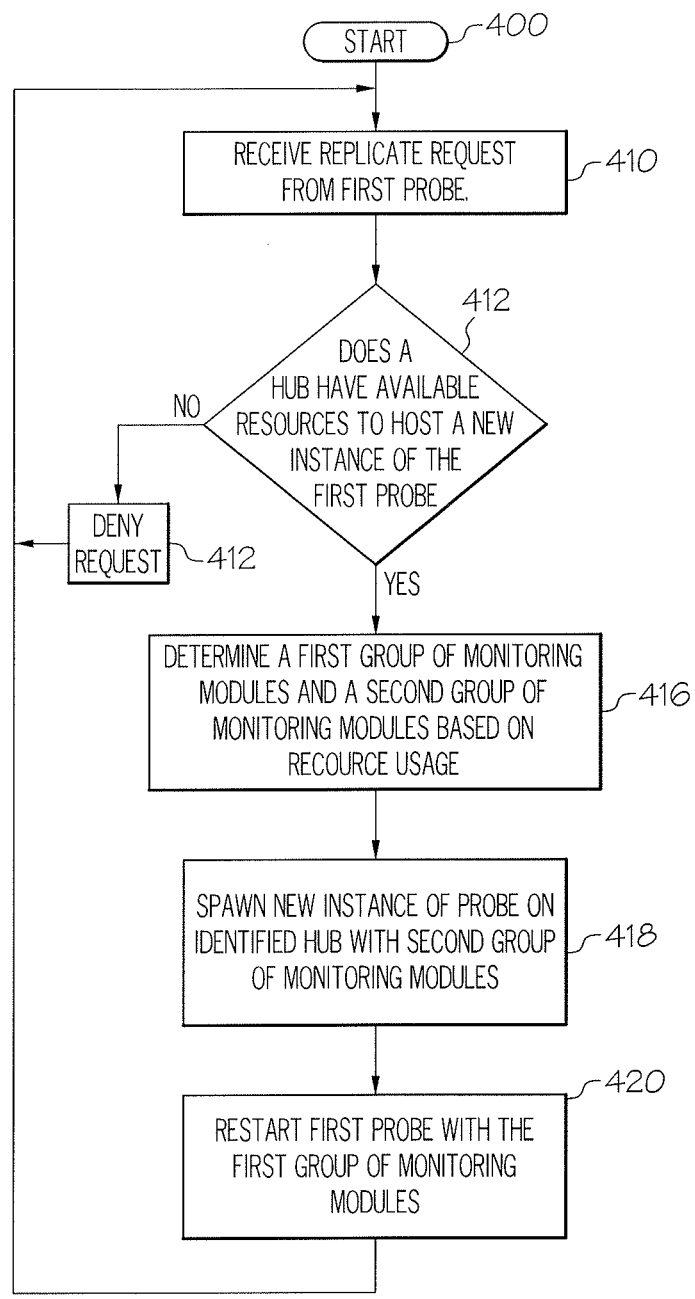
FIG. 4 illustrates an example of another method for implementing a self-spawning probe according to one embodiment of the present disclosure.

FIG. 4 illustrates an example of another method 400 for implementing a self-spawning probe according to one embodiment of the present disclosure. In method 400, hub 46 may identify another hub 46 with available resources to support a second instance of probe 38. In particular embodiments, one or more steps of method 400 may be performed by probe 38 of FIG. 1 and FIG. 2 and hub 46 of FIG. 1.

The method begins at step 410. At step 410, hub 46 receives a replication request from probe 38. A replication request may indicate to hub 46 to spawn a new instance of probe 38. The replication request may contain a list of monitoring modules 210 to associate with the new instance of probe 38. For example, probe 38 may determine its resource usage has exceeded a threshold value. Probe 38 may divide its monitoring modules 210 into a first group of monitoring modules 210 and a second group of monitoring modules 210. Probe 38 may send a request to replicate itself with the second group of monitoring modules 210 to hub 46.

At step 412, hub 46 identifies a hub 46 with available resources to host a new instance of probe 38. Hub 46 may first check its own resources. If hub 46 has resources available, hub 46 may identify itself (or a device controlled by hub 46) as a candidate to spawn a new instance of probe 38. In some embodiments, hub 46 may check available resources of other hubs 46. Hub 46 may directly query another hub 46, may broadcast an availability request to all hubs 46, or may use any other mechanism suitable to determine resource availability of another hub 46. Hub 46 may identify one or more hubs 46 with available resources. For descriptive purposes, hub 46 with available resources may be referred to as available resource hub 46. In some embodiments, hub 46 may perform additional validation regarding available resource hub 46. For example, hub 46 may determine whether access control policies permit available resource hub 46 to install or execute probe 38.

If hub 46 does not identify available resource hub 46, the method may continue to step 414 where hub 46 denies the replication request. After step 414, the method may return to step 410 where hub 46 may wait for another replication request from probe 38. If hub 46 does identify available resource hub 46, the method continues to step 416.

At step 416, hub 46 may determine a first group of monitoring modules 210 and a second group of monitoring modules 210 based on resource usage. In some embodiments, the replication request from probe 38 may include a first group of monitoring modules 210 and a second group of monitoring modules 210. In some embodiments, the replication request from probe 38 may include only one group of monitoring modules 210, and hub 46 may infer the second group of monitoring modules 210 to include any monitoring modules 210 not included in the first group of monitoring modules 210. In some embodiments, hub 46 may determine which monitoring modules 210 associated with probe 38 to group into a first group of monitoring modules 210 and which to group into a second group of monitoring modules 210. Hub 46 may group monitoring modules 210 based on resource usage associated with each monitoring module 210. In some embodiments, hub 46 may evenly divide the number of monitoring modules 210 between the first group and the second group, or hub 46 may group the monitoring modules 210 in any suitable manner. Although the examples above describe dividing monitoring modules 210 into two groups, hub 46 may group monitoring modules 210 into any suitable number of subgroups.

As an example, DME probe 38 may comprise two monitoring modules 210: monitoring module 210*a* may listen for and process messages of type A generated by host devices 14, and monitoring module 210*b* may listen for and process messages of type B generated by host devices 14. In some embodiments, hub 46 may know the list of monitoring modules 210 associated with DME probe 38, or DME probe 38 may list monitoring modules 210*a* and 210*b* in the replication request it sends to hub 46. Given monitoring modules 210*a* and 210*b*, hub 46 may determine how to divide them into two groups. For example, hub 46 may determine that available resource hub 46 may reside in a network location where it may receive more messages of type A than of type B. In this example, hub 46 may group monitoring module 210*a* into a first group and monitoring module 210*b* into a second group.

At step 418, hub 46 instructs available resource hub 46 to spawn a new instance of probe 38 associated with a group of monitoring modules 210. If hub 46 and available resource hub 46 are the same hub, then hub 46 may spawn another instance of probe 38. If hub 46 and available resource hub 46 are not the same hub, then hub 46 may send an installation package containing probe 38 to available resource hub 46 before instructing available resource hub 46 to spawn another instance of probe 38. In some embodiments, available resource hub 46 may install probe 38 from other components of system 10. An installation package may be communicated to available resource hub 46 in any suitable manner. For example, an installation package may be communicated to available resource hub 46 by communicating one or more commands to cause available resource hub 46 to copy the installation package.

As an example, hub 46 may instruct available resource hub 46 to spawn another instance of DME probe 38. Because hub 46 may have previously determined that available resource hub 46 may reside in a network location where it may receive more messages of type A than of type B, hub 46 may instruct available resource hub 46 to initialize DME probe 38 with monitoring module 210*a*. In this example, DME probe 38 may not exist on available resource hub 46. Hub 46 may send an installation package containing DME probe 38 to available resource hub 46.

At step 420, hub 46 may instruct probe 38 to continue monitoring using a first group of monitoring modules 210. In some embodiments, hub 46 may modify installation parameters associated with probe 38 to include the first group of monitoring modules 210 and then restart probe 38. In some embodiments, hub 46 may instruct probe 38 to stop processing associated with the second group of monitoring modules 210 without restarting probe 38.

As an example, hub 46 may modify an initialization file associated with DME probe 38 to include only controller 210*b*. Hub 46 may then restart DME probe 38. As an example of another embodiment, hub 46 may instruct DME probe 38 to stop monitoring for messages of type A, or hub 46 may not forward messages of type A to DME probe 38.

After step 420, the method may return to step 410 where hub 46 may wait for another replication request from probe 38. Modifications, additions, or omissions may be made to method 400. Additionally, one or more steps in method 400 of FIG. 4 may be performed in parallel or in any suitable order.

Although particular reasons for spawning a new probe instance are described above, the present disclosure contemplates spawning a new probe instance for any suitable reason, according to particular needs.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    monitoring, by a processor, resource usage associated with a first probe instance, the first probe instance being associated with a plurality of monitoring modules, each monitoring module operable to monitor information associated with a host device;
    determining, by a processor, the resource usage exceeds a threshold;
    determining a respective resource usage associated with each of the plurality of monitoring modules;
    dividing, by the processor, the plurality of monitoring modules into a first subset of monitoring modules and a second subset of monitoring modules based upon the determined respective resource usages;
    spawning, by the processor, a second probe instance, wherein the second probe instance is associated with the second subset of monitoring modules; and
    associating, by the processor, the first probe instance with the first subset of monitoring modules.

2. The method of claim 1, wherein monitoring resource usage associated with the first probe instance comprises monitoring at least one of:
    memory usage;
    message queue status; and
    data throughput.

3. The method of claim 1, wherein the plurality of monitoring modules are divided into the first subset of monitoring modules and the second subset of monitoring modules to substantially equalize respective resource usages associated with the first subset of monitoring modules and the second subset of monitoring modules.

4. The method of claim 1, wherein spawning the second probe instance comprises:
    identifying a target processor with available resources, wherein the target processor is different from the processor running the first probe instance; and
    spawning the second probe instance on the target processor.

5. The method of claim 1, wherein:
    monitoring resource usage associated with the first probe instance comprises monitoring resource usage of a first virtual machine; and
    spawning the second probe instance comprises spawning a second virtual machine.

6. The method of claim 1, wherein associating the first probe instance with the first subset of monitoring modules comprises:
    updating initialization parameters associated with the first probe instance to include the first subset of monitoring modules; and
    restarting the first probe instance.

7. The method of claim 1, wherein associating the first probe instance with the first subset of monitoring modules comprises de-associating the second subset of monitoring modules from the first probe instance.

8. The method of claim 1, further comprising:
    requesting, from a controller, permission to spawn a second probe instance, the controller operable to control a plurality of probes; and
    receiving, from the controller, permission to spawn a second probe instance.

9. A system, comprising:
    a plurality of probes each operable to monitor information associated with a host device;
    a controller operable to control the plurality of probes;
    a first probe instance of one of the plurality of probes, the first probe instance being associated with a plurality of monitoring modules, each monitoring module operable to monitor information associated with the host device; and
    the first probe instance is further operable to:
        determine a resource usage associated with the first probe instance;
        determine the resource usage exceeds a threshold;
        determine a respective resource usage associated with each of the plurality of monitoring modules;
        divide the plurality of monitoring modules into a first subset of monitoring modules and a second subset of monitoring modules based upon the determined respective resource usages;
        spawn a second probe instance, wherein the second probe instance is associated with the second subset of monitoring modules; and
        associate the first probe instance with the first subset of monitoring modules.

10. The system of claim 9, wherein the monitoring module operable to monitor resource usage associated with the first probe instance comprises a monitoring module operable to monitor at least one of:
    memory usage;
    message queue status; and
    data throughput.

11. The system of claim 9, wherein the plurality of monitoring modules are divided into the first subset of monitoring modules and the second subset of monitoring modules to substantially equalize resource usage associated with the first subset of monitoring modules and resource usage associated with the second subset of monitoring modules.

12. The system of claim 9, wherein the first probe instance operable to spawn the second probe instance comprises a first probe instance operable to:
identify a target processor with available resources, wherein the target processor is different from the processor running the first probe instance; and
spawn the second probe instance on the target processor.

13. The system of claim 9, wherein:
the first probe instance operable to monitor resource usage associated with the first probe instance comprises a first probe instance operable to monitor resource usage of a first virtual machine; and
the first probe instance operable to spawn the second probe instance comprises a first probe instance operable to spawn a second virtual machine.

14. The system of claim 9, wherein the first probe instance operable to associate the first probe instance with the first subset of monitoring modules comprises a first probe instance operable to:
update initialization parameters associated with the first probe instance to include the first subset of monitoring modules; and
restart the first probe instance.

15. The system of claim 9, wherein the first probe instance operable to associate the first probe instance with the first subset of monitoring modules comprises a first probe instance operable to de-associate the second subset of monitoring modules from the first probe instance.

16. The system of claim 9, wherein the first probe instance is further operable to:
request, from the controller, permission to spawn a second probe instance; and
receive, from the controller, permission to spawn a second probe instance.

* * * * *